(No Model.)

J. W. NYSTROM.
Process of Refrigeration.

No. 239,979.  Patented April 12, 1881.

Witnesses,
Charles S. Keyder
E. Williams

Inventor.
John W. Nystrom.

UNITED STATES PATENT OFFICE.

JOHN W. NYSTROM, OF PHILADELPHIA, PENNSYLVANIA.

PROCESS OF REFRIGERATION.

SPECIFICATION forming part of Letters Patent No. 239,979, dated April 12, 1881.

Application filed January 3, 1881. (No Model.)

*To all whom it may concern:*

Be it known that I, JOHN W. NYSTROM, of the city and county of Philadelphia, in the State of Pennsylvania, have invented certain new and useful Improvements in the Processes of Refrigeration for the purpose of cooling and curing ham and other meat, and also for freezing water to ice, of which the following is a specification.

My invention consists in generating a continuous cold by rarefied air in direct contact with the substances to be refrigerated, which is accomplished by admitting air of atmospheric pressure to work expansively a cylinder-piston, like steam in a steam-cylinder, and the air, so expanded and consequently much reduced in temperature, is forced by the same piston through pipes into one or more refrigerators inclosing the substances to be cooled or frozen. A partial vacuum is maintained in the refrigerators by a pump drawing out the air therefrom.

Figure 1:
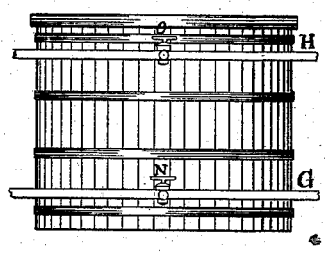
Figure 2:
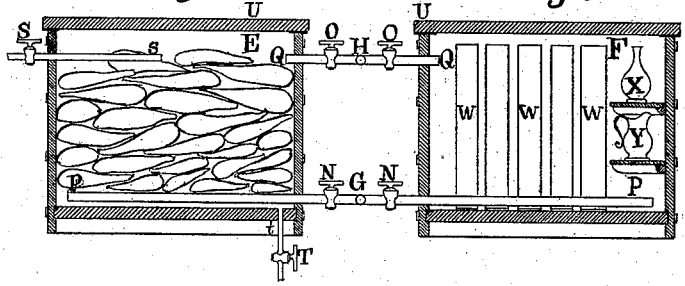
Figure 3:
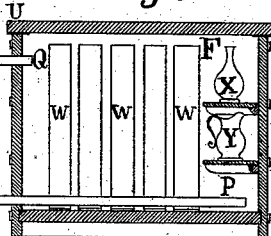
Figure 4:
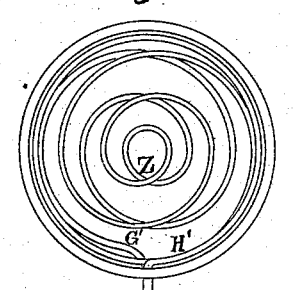
Figure 5:
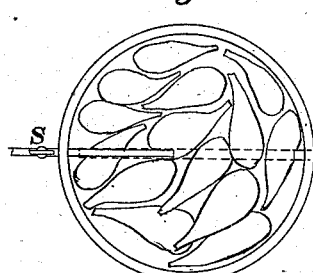
Figure 6:
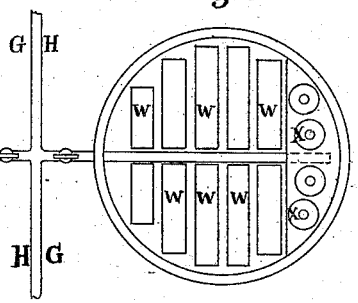
Figure 7:
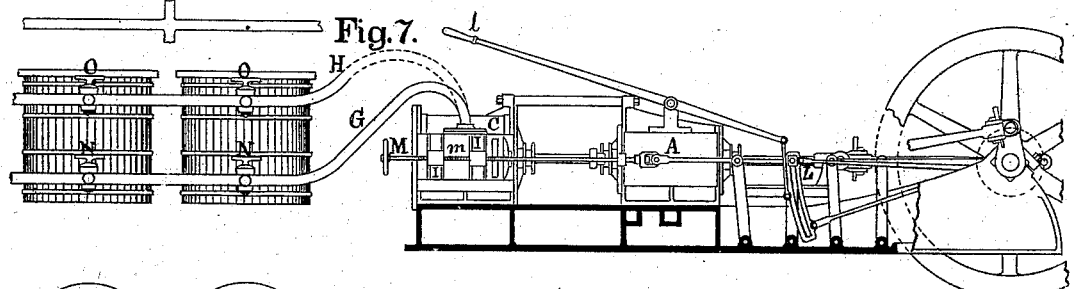
Figure 8:
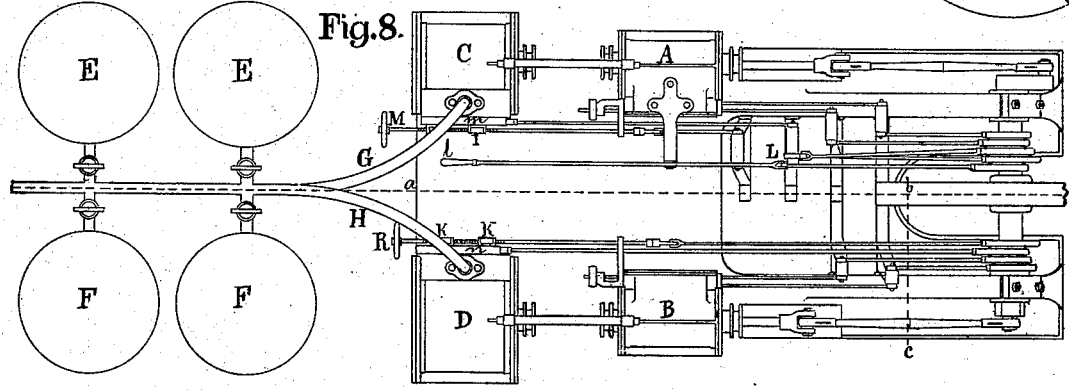

The accompanying drawings represent the apparatus and the machinery in and by which the process of refrigeration operates, namely:

Figure 1 is a side elevation of a refrigerator, which consists of a cylindrical wooden vessel with top and bottom of the same material, all jointed air-tight. Fig. 2 is a vertical section, showing the inside arrangement, which in this case represents hams to be refrigerated and cured. Fig. 3 is also a vertical section of a refrigerator, showing how molds for freezing water to ice can be arranged. Fig. 4 is a plan of Fig. 1, with the top taken off, showing how a coil of pipes can be arranged for refrigerating a liquid under atmospheric pressure. Fig. 5 is a plan of Fig. 2 with the top taken off, for showing the arrangement of hams in the refrigerator. Fig. 6 is a plan of Fig. 3 with the top taken off, to show the arrangement of ice-molds. Fig. 7 is a side elevation and section of the machinery by which the process of refrigeration is operated, showing, also, how refrigerators can be arranged and connected with pipes. Fig. 8 is a plan of Fig. 7, showing the arrangement of the machinery and refrigerators, and how they are connected with pipes. The dotted line *a b c* is the section through the bed-plate, as shown by Fig. 7.

The machinery, as represented on the drawings, consists of two horizontal steam-engines coupled to cranks at right angles on one shaft, with cylinders A and B, working directly two air-pumps, C and D, for circulating rarefied air to and from the refrigerators E and F through the pipes G and H. The pistons in the steam-cylinders and pumps are connected by one piston-rod in each engine. The air is regulated into and from the pumps by ordinary slide-valves worked by eccentrics on the main shaft. The air cut-off valves I and K work on the back of the main valves *m* and *n*.

The air-pump C can be used for pumping air either into or out from the refrigerators, by reversing the main valve *m* with the link-motion L and lever *l*.

When the process of refrigeration is first started—that is, when the refrigerators contain air of atmospheric density—then both the pumps C and D are used for exhausting the air until a required vacuum is attained, when the slide-valve *m* is reversed, and the pump C then pumps rarefied air into the refrigerators, while the pump D exhausts the air therefrom. The grade of expansion of the air in the pump C is regulated by the hand-wheel M, working a right-and-left-handed screw in the cut-off valves I, and thus sufficient air can be admitted to maintain a desired vacuum in the refrigerators. The cut-off should, however, be so regulated that the expanded air in the pump C should be of about the same density as that in the main pipe G, for if of less density the air will enter from the pipe G into the pump at each stroke, and if of greater density the air will expand from the pump into the pipe. In either case work will be performed which generates heat, to the detriment of the refrigeration.

The action of the pump C can be reversed at any time during the process of refrigeration, which may be required for increasing the vacuum occasionally.

The slide-valves, both for pumps and steam-cylinders, are constructed similar to those on propeller-engines, which are well known to mechanical engineers, and need no detailed description.

The air thus expanded in the pump C becomes very cold, and is forced into the refrigerators through the pipe G. Any desired number of refrigerators can be connected with main pipes G and H, and the air-connections with any one or more refrigerators can be opened or closed by valves or cocks N and O. The branch pipe P from the cock N extends on the bottom to near the opposite side in the refrigerator, for making a better circulation of cold air around the substances operated upon, and when it reaches the exhaust-pipe Q the air is moist and of higher temperature than at P. The moist air is then drawn out through the main pipe H by the pump D and discharged through the air-ports into the atmosphere. The moist air at Q occupies a larger volume than does the dry air at P; and therefore the pump D must be that much larger than the pump C. The cut-off valve K on the pump D is for preventing the outside air from entering before the moist air in the pump is compressed to about atmospheric density, and the cut-off is regulated by the hand-wheel R to open at the proper moment.

When ham or other meat is refrigerated as above described, and to be cured and corned, pickle-brine is, by atmospheric pressure, injected through the cock S and pipe s, Fig. 2, into and among the meat, which is then in a partial vacuum in the refrigerator. The cock N is closed before the cock S is opened, but the cock O is kept open and the air exhausted until the meat is covered by the brine, when the cock O is closed. Full air-pressure is then admitted into the refrigerators, which presses the brine into the meat, and thus cures or corns the same very rapidly, after which the brine is drawn out through the pipe t and cock T. The top U is then taken off and the ham or meat removed for a fresh supply in the refrigerator. The changing of the ham or meat in one or more refrigerators can be accomplished while refrigeration is going on in the others.

For the freezing of water to ice, Figs. 3 and 6, the operation is the same as that for refrigerating ham, except that no brine is used. The changing of the water or ice-molds W can be accomplished in one or more refrigerators while the freezing is going on in the others. Any form of molds can be used, of which are shown bottles X and pitchers Y.

For refrigerating liquids under atmospheric pressure, as required in breweries, a coil of pipe, Z, is placed on the bottom and sides in the refrigerator, through which coil the rarefied air is circulated from G', connected with the main G, to H', which is connected with the pipe H. The substances to be refrigerated being in a partial vacuum, the heat is extracted therefrom by the force of expansion, while when refrigerated under atmospheric pressure the heat is extracted by conduction. The former operation is more rapid than the latter. The working of the refrigeration under a partial vacuum avoids the many difficulties generally attending the use of high air-pressure.

I do not confine myself to any particular construction of the machinery or refrigerators, which can vary according to circumstances.

I claim as my invention—

1. The process of expanding air of atmospheric density in a pump, and forcing the so expanded air into a partial vacuum in one or more refrigerators, from which the rarefied air is pumped out into the atmosphere, substantially as and for the purpose described.

2. The process of pumping air either into or out from the refrigerator by one and the same pump, substantially as and for the purpose described.

JOHN W. NYSTROM.

Witnesses:
S. W. WILLIAMS,
CHARLES S. KEYSER.